(12) United States Patent
Boerger

(10) Patent No.: US 8,270,611 B2
(45) Date of Patent: Sep. 18, 2012

(54) SYSTEM AND METHOD FOR COMMUNICATING WITH A KEY VARIABLE LOADER (KVL) USING A STANDARD UNIVERSAL ASYNCHRONOUS RECEIVER TRANSMITTER (UART) PERIPHERAL

(75) Inventor: Mark A. Boerger, Plantation, FL (US)

(73) Assignee: Motorola Solutions, Inc., Schaumburg, IL (US)

(*) Notice: Subject to any disclaimer, the term of this patent is extended or adjusted under 35 U.S.C. 154(b) by 1960 days.

(21) Appl. No.: 10/814,315

(22) Filed: Mar. 31, 2004

(65) Prior Publication Data

US 2005/0220307 A1    Oct. 6, 2005

(51) Int. Cl.
*H04L 9/00* (2006.01)
*H04K 1/00* (2006.01)
*G06F 11/00* (2006.01)

(52) U.S. Cl. ............... 380/277; 380/270; 714/800

(58) Field of Classification Search ............ 380/270, 380/277
See application file for complete search history.

(56) References Cited

U.S. PATENT DOCUMENTS

| | | | | |
|---|---|---|---|---|
| 4,278,837 A * | 7/1981 | Best | ...... | 713/190 |
| 5,185,795 A * | 2/1993 | Bright | ...... | 713/181 |
| 5,481,610 A * | 1/1996 | Doiron et al. | ...... | 380/270 |
| 5,742,502 A | 4/1998 | King | | |
| 5,790,885 A * | 8/1998 | Shona | ...... | 710/5 |
| 6,859,537 B1 * | 2/2005 | Houlberg et al. | ...... | 380/277 |
| 2002/0018571 A1 * | 2/2002 | Anderson et al. | ...... | 380/277 |
| 2004/0193769 A1 * | 9/2004 | Okumura | ...... | 710/267 |

OTHER PUBLICATIONS

PSWN, Introduction to Encryption Key Management for Public Safety Radio System, Oct. 2001, pp. 1-26.*

* cited by examiner

*Primary Examiner* — Nathan Flynn
*Assistant Examiner* — Trang Doan

(57) ABSTRACT

An encryption key interface system (200) includes a universal asynchronous receiver transmitter (UART) peripheral (209) that communicates with a key variable loader (KVL) (201) through a communications link (205, 207). A driver application (211) associated with the UART peripheral (209) is used to both receive and transmit commands to the KVL (201). The invention operates to allow the driver application (211) to communicate key command information to the KVL (201) without the use of a timer peripheral enabling the system to interface with a much broader range of devices utilizing encryption keys without requiring the use of timer system resources.

11 Claims, 2 Drawing Sheets

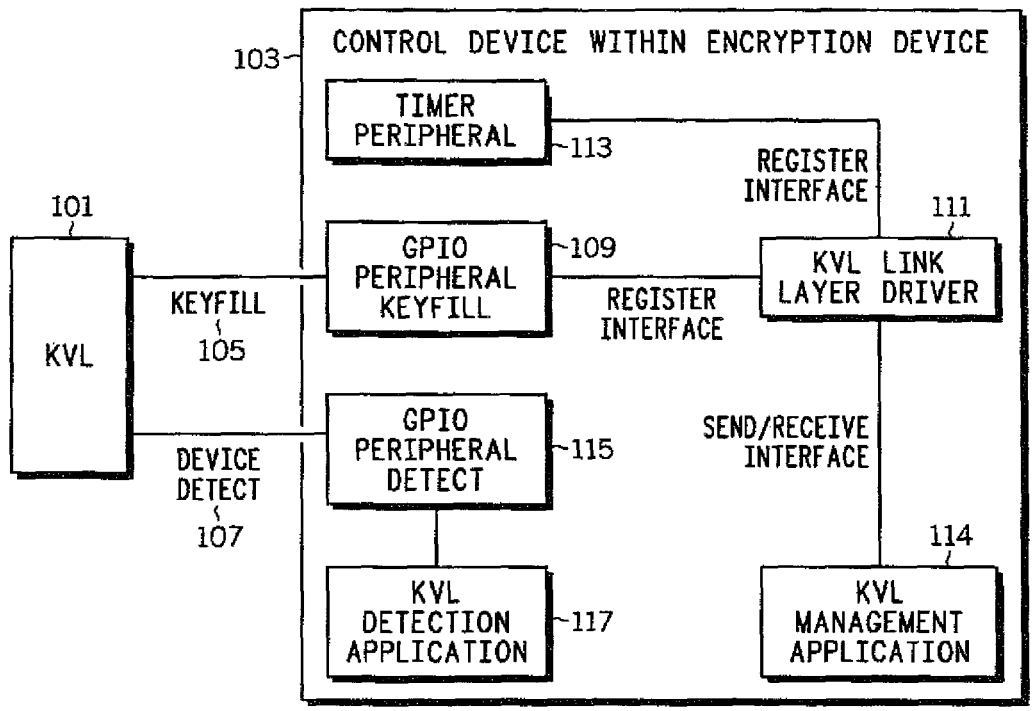
FIG. 1 *100* - Prior Art -
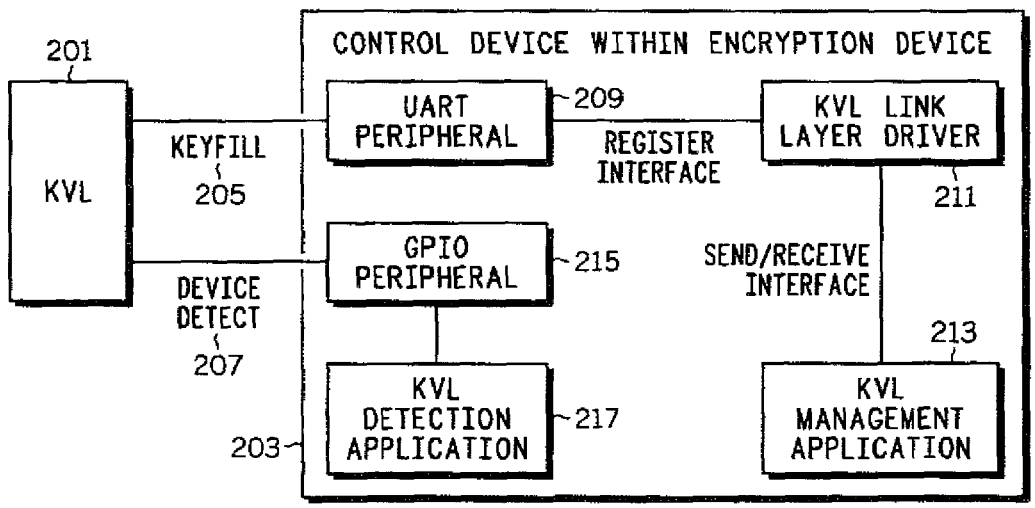
*200* FIG. 2

SYSTEM AND METHOD FOR COMMUNICATING WITH A KEY VARIABLE LOADER (KVL) USING A STANDARD UNIVERSAL ASYNCHRONOUS RECEIVER TRANSMITTER (UART) PERIPHERAL

TECHNICAL FIELD

This invention relates in general to loading encryption keys to an electronic device and more particularly to a system and method of transferring encryption keys using a universal asynchronous receiver transmitter (UART) peripheral.

BACKGROUND

Many electronic products today include requirements that data transmitted or received at the device be in a "secure" format. Many public service two-way radio products require that communications either sent to or received from the radio be encrypted to ensure the accuracy and security of the voice or data exchanged during a communication. Since encryption has been used for many years, there are many different formats and methods by which data can be encrypted within these devices.

With regard to two-way radio communications, in order to facilitate the encryption of data, an encryption key along with a complex algorithm is used in the radio to enable data to be encrypted or decrypted. The encryption key is transferred to encryption circuitry within the radio which, in part, instructs the radio on how to process the encrypted communications. Prior art loading techniques typically use a key loader, which acts as an interface to facilitate the transmission of a desired encryption key from a computer to the radio. More recently, more complex key loading technology has been used where a key variable loader (KVL) is used to generate encryption keys and to communicate with a universal crypto module (UCM) located within the radio for the purpose of transferring encryption keys to the UCM. All encryption key information is received from the KVL where it is then stored within the UCM which is a separate physical device. A user may load key information into the UCM through the use of either the KVL or through over-the-air transmission (OTAR) commands. For the purpose of OTAR, the UCM initially communicates with the KVL to acquire key encryption keys (KEKs) for use with the encryption commands sent over the air from fixed network equipment (FNE).

Prior art FIG. 1 shows a key loader communications system 100 that includes a KVL 101 connected to a control device 103 typically located in an encryption device (not shown). The KVL 101 communicates with the control device 103 via a keyfill line 105 and device detect line 107. Data is conveyed from the KVL 101 over the keyfill line 105 to a first general purpose input output peripheral (GPIO keyfill) 109. The GPIO captures data coming in from the KVL 101 or it can also transmit data in a bi-directional fashion back to the KVL. The difficulty in using the GPIO 109 is that it must sample data over the keyfill line 105 at a high rate. Sampling must occur at a speed that enables the GPIO 109 to capture a complete byte of data.

Thus, the GPIO 109 must operate at a sufficient speed to detect all bit transitions such that no command or control information is lost from the KVL 101. The GPIO 109 is connected to a KVL link layer driver 111 through a register interface. A timer peripheral 113 is connected to the KVL link layer driver 111 for conveying timing information for data sampling over the keyfill line 105. The KVL link layer driver 111 is the controlling software that uses timing information from the timer peripheral 113, along with data sampled from the GPIO peripheral 109, to send or receive encryption key command data to a KVL 101 application. The KVL application 114 is the software application that interprets key load and key management commands so that the control device 103 accurately interprets the data from the KVL 101. The KVL application 114 works to accurately interpret incoming data before it will accept any key from KVL 101. A second GPIO peripheral (GPIO detect) 115 connects the KVL 101 through a device detect line 107. The KVL detection application 117 uses the GPIO N to detect the occurrence of a logical low on the device detect line. This allows the control device 103 to detect the presence of the KVL 101 and any subsequent control commands sent from that device. It should be evident to those skilled in the art that any number (N) of GPIO peripherals may be used for accomplishing any number of interface tasks.

One problem associated with this prior art architecture is that it will operate only with control devices that include a GPIO 109. Moreover, this architecture works relatively slowly when the KVL 101 utilizes the keyfill line 105. Specifically, when the KVL 101 is connected to the control device through GPIO 109, the processing resources required to drive and sample the keyfill line via a GPIO 109 and a timer peripheral 113 render the encryption devices unable to accomplish any other tasks in parallel. With such a heavy use of processing resources, a device such as a two-way radio cannot accept an incoming dispatch communication since the processor is occupied interpreting encryption commands from KVL 101.

Accordingly, the need exists for a system and method for communicating with a KVL enabling the KVL to communicate with a broader range of devices utilizing encryption keys without requiring the use of all system processing resources.

SUMMARY OF THE INVENTION

An encryption key interface incorporated within an electronic device for communication with a key variable loader (KVL) includes a universal asynchronous receiver transmitter (UART) peripheral for transmitting and receiving key commands from the KVL. A KVL link layer driver application is used for communicating command information to the UART peripheral while a KVL management application operates with the KVL driver application for interpreting key command data from the KVL. Further, a general purpose input output peripheral operating with a KVL detection application is also used when a KVL is initiating communication with the electronic device. The UART peripheral and GPIO peripheral communicate with the KVL over separate communications links to establish communication and transfer key encryption information to the KVL link layer driver application and the KVL management application. The invention offers a novel system and method of establishing communication with the KVL allowing the KVL driver to operate without a timer peripheral. This is accomplished using the UART peripheral which can utilize parity error information to validate communication with the KVL.

BRIEF DESCRIPTION OF THE DRAWINGS

The features of the present invention, which are believed to be novel, are set forth with particularly in the appended claims. The invention, together with further objects and advantages thereof, may best be understood by reference to the following description, taken in conjunction with the accompanying drawings, in the several figures of which like reference numerals identify like elements, and in which:

FIG. 1 is a prior art block diagram of a control device connected to variable key loader using a general purpose input output peripheral (GPIO).

FIG. 2 is a block diagram of a variable key loader system including a control device connected to a variable key loader (KVL) using a universal asynchronous input output peripheral (UART) according to the preferred embodiment of the invention.

DETAILED DESCRIPTION OF THE PREFERRED EMBODIMENT

Figure 3:
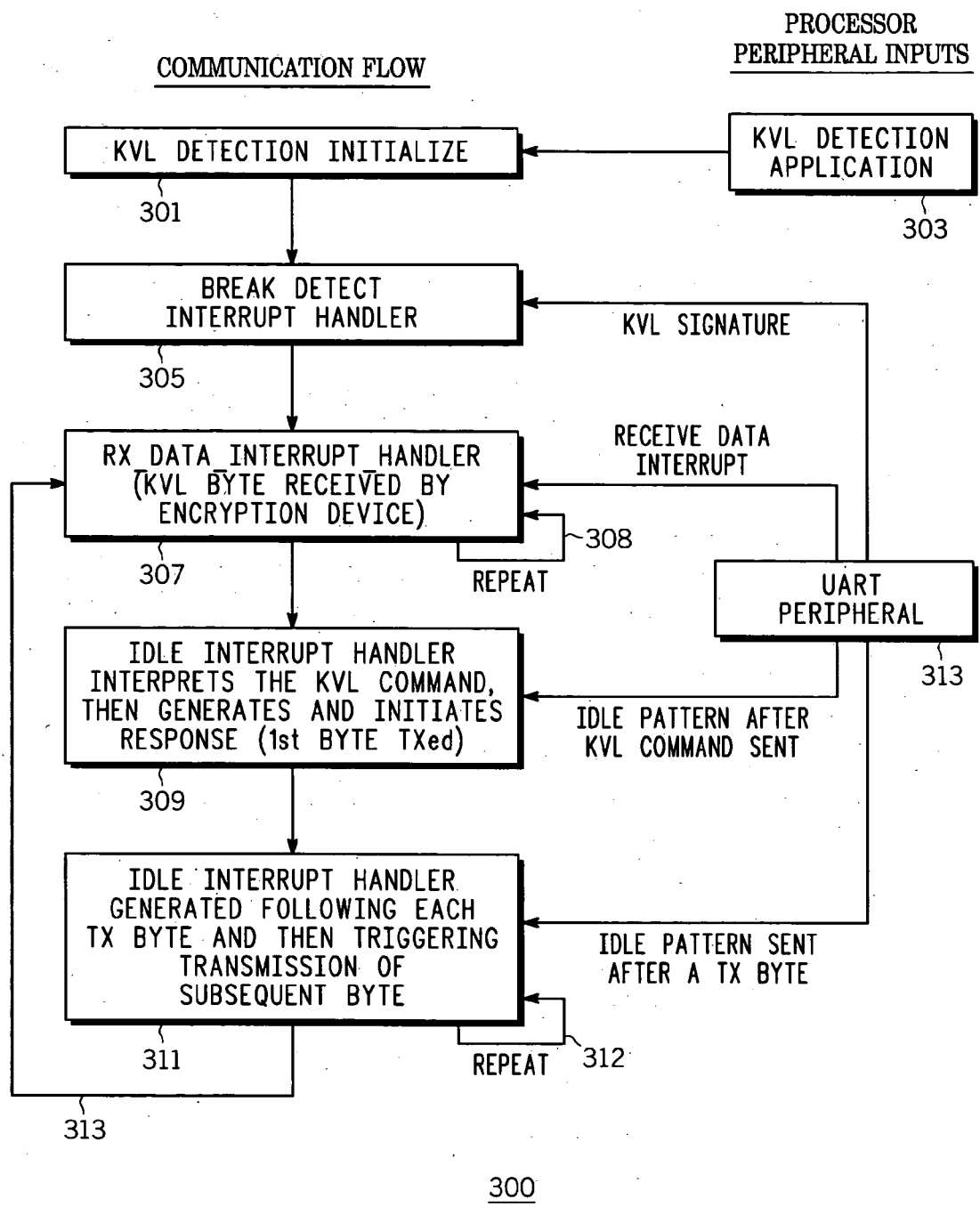
FIG. 3 is a flow chart diagram illustrating operation of the variable key loader connected to a control device using a UART in accordance with the system shown in FIG. 2.

While the specification concludes with claims defining the features of the invention that are regarded as novel, it is believed that the invention will be better understood from a consideration of the following description in conjunction with the drawing figures, in which like reference numerals are carried forward.

Referring now to FIG. 2, the system for communicating with a key variable loader using a standard universal asynchronous receiving transmitter peripheral 200 includes a variable key loader (KVL) 201 connected to a control device 203 that is typically located within an encryption device (not shown). The KVL 201 connects to the control device 203 using a keyfill line 205 and device detect line 207. The control device 203 includes a universal asynchronous receive transmit (UART) peripheral 209 which is used to receive read and write commands from the KVL 201 over keyfill line 205. The UART 209 works to perform key management activities through the KVL link layer driver 211 to a KVL application 213 while encrypting or decrypting voice or data communications that are facilitated in parallel.

The KVL link layer driver 211 is the software that utilizes the UART peripheral 209 resources to receive encryption commands from the KVL 201. As discussed herein, this is accomplished using a novel protocol between the UART peripheral 209 and the KVL link layer driver 211 where stop bits are used in the data protocol to convey current ownership of the interface. Using this type of data protocol requires the control device 203 to ignore framing errors and instead uses parity error information to calculate when the UART peripheral 209 will interrupt communication with the KVL 201. The KVL link layer driver 211 is connected to the UART peripheral 209 though a register interface for receiving and transmitting these encryption commands. The KVL application 213 is the software application that interprets key load and key management commands so that the control device 203 accurately interprets the data from the KVL 201. The KVL application 213 is connected to the KVL link layer driver 211 through a send/receive interface. As will be evident to those skilled in the art, the UART peripheral 209 operates to facilitate encryption device deployment on the next generation control devices by simplifying the hardware interface to the KVL. Finally, the general purpose input output (GPIO) peripheral 215 uses the KVL application 217 for detecting connection of the KVL 201 through device detect line 207.

FIG. 3 illustrates a flow chart diagram 300 showing the execution of a KVL communications session with a control device shown in FIG. 2. According to the preferred method of the invention, a control device will detect a variable key loader 301 using a KVL detection application 303. The UART operates using a set of interrupts to its processor so that the processor can detect a protocol event occurring on the keyfill line. This event might include such things as receiving encryption command data or perhaps waiting for additional data to be sent from a KVL. Thus as part of an initialization process, the UART peripheral determines 305 whether a break detect interrupt has been received. The break detect interrupt may take the form of a digital KVL signature from the KVL which indicates to the UART that the KVL is connected and attempting to send an encryption command. Once a break detect interrupt is detected, this initializes the KVL link layer driver for receive operations.

While receiving data in a receive mode, the KVL link layer driver detects 307 a receive data interrupt command (RX_DATA_INTERUPT) sent by the UART peripheral upon sampling a 9 bit data packet. When the receive data interrupt command is received, the KVL link layer driver ignores framing errors from the UART over the register interface. The KVL link layer driver uses parity error detection rather than framing error data to determine if the encryption command data received by the UART is corrupted. This is accomplished by transferring one byte of the received data into a buffer (not shown) which can be used by the KVL application (not shown) once a complete message is received. Thus, this step loops back 308 and repeats until an entire message is received from the KVL where each byte sent by the KVL will trigger the UART to generate a receive data interrupt command until an entire message is received.

Following a multi-byte message sent from the KVL, the keyfill line connecting the KVL to the UART may include an idle pattern where the keyfill line will float to logic high. An idle pattern is typically at least 2 to 3 byte times of data, which remain high. When the KVL link layer detects this idle interrupt event it will call the KVL Application 309 to interpret the encrypted command which is stored in the receive data buffer. This KVL Application 309 will formulate a reply message, place it in a transmit buffer, and inform the UART to transmit the first byte of this command.

A second idle interrupt may also be generated 311 by the UART peripheral following each transmit byte so this may trigger the sending of the next byte. This step repeats 312 until an entire response is sent to the encryption device. However, this entire sequence may repeat 313 to accomplish the desired key management tasks such as loading, viewing and deleting key material for a control device.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An encryption key interface system comprising:
   a universal asynchronous receiver transmitter (UART) peripheral for communicating with a key variable loader (KVL) through a keyfill line;
   a driver application associated with the UART peripheral for receiving and transmitting commands to the KVL; and
   wherein the driver application operates to communicate key command information to the KVL without the use of a timer peripheral and enables the UART peripheral to utilize parity error information to validate communication with the KVL through the keyfill line.

2. An encryption key interface system as in claim 1, further comprising:
   a key management application for communication with the driver application for managing the key management information.

3. An encryption key interface system as in claim 2, further comprising:
   a general purpose input output (GPIO) peripheral for communicating with the KVL to detect when the KVL is connected with the interface.

4. An encryption key interface system as in claim 3, further comprising:
   a KVL detection application for managing operation of the GPIO peripheral.

5. An encryption key interface system as in claim 3 wherein the UART peripheral and the GPIO peripheral communicate with the KVL over separate data links.

6. An encryption key interface incorporated within an electronic device for communicating with a key variable loader (KVL) comprising:
   a universal asynchronous receiver transmitter (UART) peripheral for transmitting and receiving key commands from the KVL through a keyfill line;
   a KVL driver application for communicating command information to the UART peripheral;
   a KVL management application operating with the KVL driver application for interpreting key command data from the KVL; and
   wherein the KVL driver operates without a timer peripheral enabling the UART peripheral to utilize parity error information to validate communication with the KVL through the keyfill line.

7. An encryption key interface as in claim 6, further comprising:
   a general purpose input output peripheral operating with a KVL detection application for detecting when a KVL is initiating communication with the electronic device.

8. An encryption key interface as in claim 6, wherein the UART peripheral and GPIO peripheral communicate with the KVL over separate communications links.

9. A method for using an encryption key interface for communicating key encryption information from a variable key loader (KVL) to an electronic device comprising the steps of:
   detecting a first detection signal at a universal asynchronous receiver transmitter (UART) within the electronic device;
   transmitting data from the KVL to the UART;
   transmitting a second detection signal from the UART to a KVL application when the UART detects a receive data byte;
   transmitting a third detection signal from the UART to the KVL application indicating all data has been received, wherein the third detection signal is idle pattern detect indicating a predetermined number of idle byte times have been received by the UART; and
   transmitting a fourth detection signal from the UART to a KVL link layer application for sending subsequent data until all data has been transmitted by the UART, wherein the fourth detection signal is idle pattern detect indicating to continue transmitting another byte in the response message.

10. A method for using an encryption key interface as in claim 9, wherein the first detection signal is a break detect indicating a unique KVL signature.

11. A method for using an encryption key interface as in claim 10, wherein the second detection signal is a receive data interrupt command indicating to the UART that data has been transmitted from the KVL.

\* \* \* \* \*